No. 642,735. Patented Feb. 6, 1900.
F. J. VESTAL.
DRAFT EQUALIZER.
(Application filed July 20, 1899.)
(No Model.)
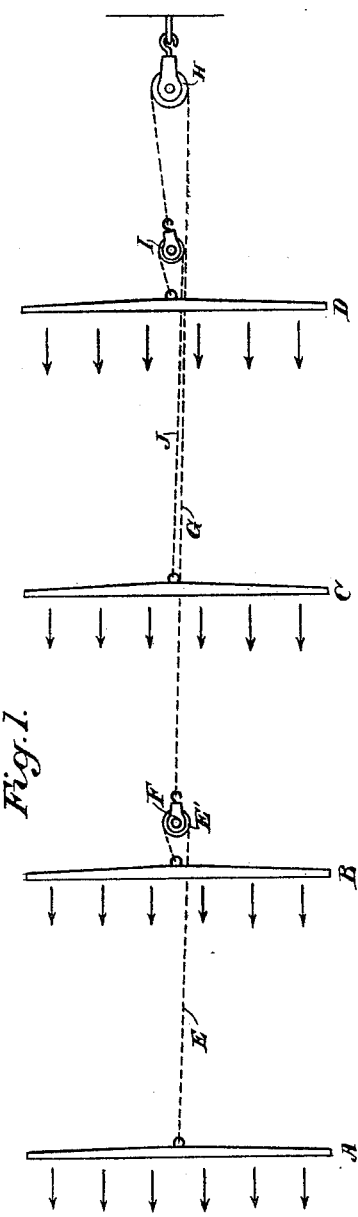
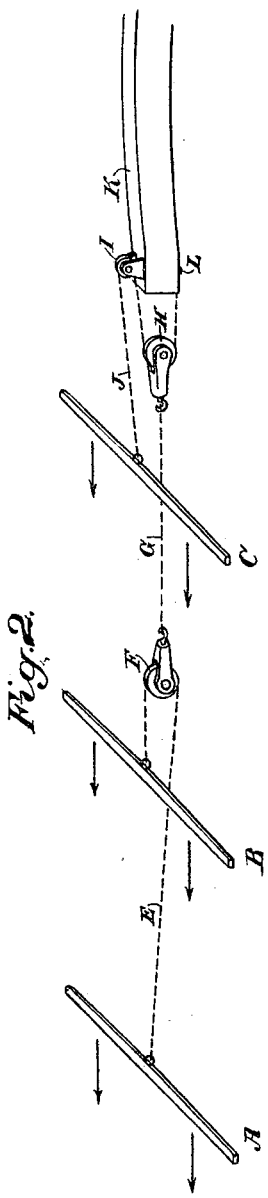
Witnesses,
Inventor,
Flavious J. Vestal
By Dewey Strong & Co.
Attys

UNITED STATES PATENT OFFICE.

FLAVIOUS J. VESTAL, OF PLEASANT GROVE, CALIFORNIA.

DRAFT-EQUALIZER.

SPECIFICATION forming part of Letters Patent No. 642,735, dated February 6, 1900.

Application filed July 20, 1899. Serial No. 724,504. (No model.)

*To all whom it may concern:*

Be it known that I, FLAVIOUS J. VESTAL, a citizen of the United States, residing at Pleasant Grove, county of Sutter, State of California, have invented an Improvement in Draft-Equalizers; and I hereby declare the following to be a full, clear, and exact description of the same.

My invention relates to a means for equalizing the draft and the application of the power of large teams when applied for hauling harvesters, plows, or other heavy machinery.

It consists in the parts and the constructions and combinations of parts hereinafter described and claimed.

Figure 1 is a view showing my invention applied to a harvester-team of twenty-four horses. Fig. 2 shows the application to a plow with a team of six horses.

In driving teams composed of many draft-animals it is very difficult to equalize the power, so that all the animals will have an equal amount of work; and it is the object of my invention to so connect the animals composing the team that any extra pull by any animal or part of the team will be transmitted through the connections, so that it will act directly upon the remainder of the team and divide the strain of the pull equally between them.

The invention is illustrated by diagrammatic views.

In Fig. 1 I have shown the draft-bars A, B, C, and D, adapted for the attachment of six horses to each in a manner usual in such teams. To the center of the draft-bar A is connected a flexible chain or rope E, which extends rearwardly to a point behind the draft-bar B. It there passes around a pulley E' and is attached to the second draft-bar B. This divides the pull, so that the twelve horses attached to draft-bars A and B pull equally upon the pulley-block F, in which it is journaled. From this block a rope or chain G extends backwardly and passes around a pulley H, thence leading forward and connecting with the block of a pulley I. A rope or chain J passes around the pulley I, and its two ends are respectively connected with the draft-bars C and D, so that the twelve horses attached to each of these draft-bars balances their pulls through the chain J and pulley I, and these twelve are in turn balanced against the pull of the horses attached to the draft-bars A and B by means of the chain G, which passes around the pulley H and connects the pulleys F and I. The block of the pulley H is attached to the machine or structure to be drawn, and it will be seen by this construction if any one of the independent teams pulls harder than another the pull will be transmitted through the chain to the team behind, thus equalizing the pull of these two, and if the pull of these two teams is greater than that of the other two teams the connection of the rope G around the pulley H will also equalize the whole pull of these two teams with those of the other two and in the same way with any proportioned team that may be used.

Practice has shown that if any one animal or component part of a team is inclined to shirk and not do the proper amount of work as soon as this extra pull is brought upon them they will immediately move up and do their proper share of the work.

In Fig. 2 I have shown the application of the device to a team of six horses, one pair being attached to each of the doubletrees or draft-bars A, B, and C. In this case the rope E passes from the draft-bar A around the pulley F, and this connects with the draft-bar B, thus balancing the two teams of two horses each. From the pulley F the rope G extends back and connects with the block or support of the pulley H, so that the pull of the two teams or four horses is brought upon the axle or support of the pulley H. There is now left one team of two horses attached to the draft-bar C, and in order to equalize the pull of these two horses against the other four the rope J has one end connecting with the draft-bar C, thence passes around a pulley I, journaled upon the front of the plow-beam K or other structure to be drawn, and thence the rope extends forward around the pulley H and has its other end attached to the beam K, as shown at L. By this division all the pull of the two forward teams of four horses is brought upon the support of the pulley H. Of the two parts of the rope J which pass around this pulley one part is fixed at L and the other passes around the pulley I, thus dividing the pull of the two teams into two equal parts. Of these one part is applied directly to the team or frame K through the attachment at L and the other passing around the pulley I gives the equivalent pull upon the draft-bar C of one team, which equalizes the team attached to said draft-bar. The pull of all the animals is thus equalized, and it will be manifest that by this division and application of power any other arrangement of teams can be similarly connected up.

Having thus described my invention, what I claim as new, and desire to secure by Letters Patent, is—

1. In a draft-equalizing device, the draft-bars A and B, to which two teams are attached, a chain connecting the center of the first draft-bar with the center of the second, the bight of said chain passing around a pulley in the rear of the second draft-bar, a second chain connected with the support of said pulley and extending backward and around a pulley which is connected with the machine to be drawn, two other draft-bars C and D to which teams are attached, said draft-bars being connected by a chain, the bight of which passes around a pulley in the rear of the rearmost draft-bar, and connections between the support of said pulley and the chain which leads rearwardly from the two front draft-bars.

2. In a draft-equalizing device, a pulley connected with the machine to be drawn, a chain passing around said pulley, the two ends leading forward and connecting with the supports of two other pulleys, chains passing around each of these pulleys and connecting each with two draft-bars to which teams are attached whereby the pull of each two teams is counterbalanced by the ropes passing around the pulleys intermediate between their draft-bars, and each two teams are equalized with each other by the first-named or main rope which passes around the pulley connecting with the machine.

In witness whereof I have hereunto set my hand.

FLAVIOUS J. VESTAL.

Witnesses:
J. J. WATSON,
WM. HAMLIN.